No. 643,237. Patented Feb. 13, 1900.
O. M. ROW.
CONNECTING TUBES TO TUBE PLATES.
(Application filed Jan. 18, 1899.)
(No Model.)
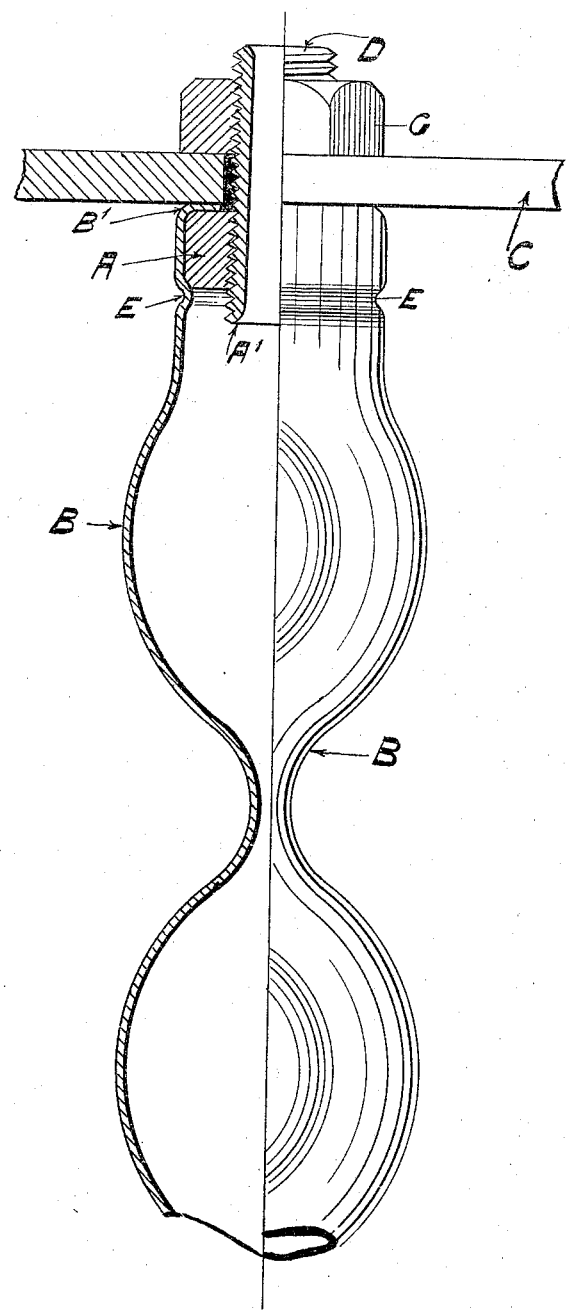
WITNESSES
John J. Royle
Arthur Gresty
INVENTOR
Oliver Matthews Row

UNITED STATES PATENT OFFICE.

OLIVER MATTHEWS ROW, OF MANCHESTER, ENGLAND.

CONNECTING TUBES TO TUBE-PLATES.

SPECIFICATION forming part of Letters Patent No. 643,237, dated February 13, 1900.

Application filed January 18, 1899. Serial No. 702,564. (No model.)

*To all whom it may concern:*

Be it known that I, OLIVER MATTHEWS ROW, a subject of the Queen of Great Britain and Ireland, and a resident of Manchester, England, have invented Improvements in Connecting Tubes to Tube-Plates for Use in Feed-Water Heaters and the Like, (for which I made application for British patent on the 23d day of June, 1898, No. 13,913,) of which the following is a specification.

My invention relates to the more effective attaching of tubes to the tube-plates of feed-water heaters and similar appliances.

The accompanying drawing illustrates my invention as applied to one end of the improved heating-tube for which a United States patent was granted to me on the 6th day of February, 1894, No. 514,338.

The device consists of a bush or plug A of a size about equal to the internal diameter of the copper tube B to be connected to the tube-plate C. Into this bush A, I screw a copper nipple D, which is "flared" or expanded at the end A' to more securely fix it into the bush or plug A. This bush or plug, with its connecting-nipple, I knock or drive for a short distance into the tube B, which is here illustrated as formed under the before-mentioned patent, and I then roll a groove E behind the bush to prevent it moving farther inward, and the portion of tube projecting beyond the bush I roll over the end of the bush, as shown at B', and so I firmly secure the bush or plug A in the tube, leaving an extension of the copper tube surface spread over the outer end of the bush or plug. The tube so prepared is now passed through a suitable hole in the tube-plate C and will be secured in position by the nut G on the opposite side of the tube-plate. An effective joint is thus made between the tube-plate and the substance of the tube itself and which is found to be particularly advantageous in fixing the form of tube hereinbefore referred to. In most cases the soft copper surface of the tube itself is sufficient to form the joint; but packing material may be inserted, if found desirable.

Having thus particularly described and ascertained the nature of my said invention, I declare that what I claim is—

In combination, a tube-plate with holes, a tube with inwardly-flanged end, a bush within the tube and immediately behind the flange, a nipple connected with the bush, a nut screwing onto the nipple above the tube-plate, and with the inwardly-flanged end of the tube lying between the tube-plate and bush, as and for the purposes set forth.

In witness whereof I have hereunto set my hand in the presence of two witnesses.

OLIVER MATTHEWS ROW.

Witnesses:
JOHN I. ROYLE,
ARTHUR GRESTY.